US012801421B2

(12) United States Patent
Soumpholphakdy et al.

(10) Patent No.: US 12,801,421 B2
(45) Date of Patent: Nov. 17, 2026

(54) LOAD BALANCING AND FAILOVER WITH VIRTUAL NETWORK INTERFACE IN A CLOUD-BASED CLUSTERED FILE SYSTEM

(71) Applicant: Dell Products L.P., Round Rock, TX (US)

(72) Inventors: Steven Soumpholphakdy, Chicago, IL (US); Deepak Vijay, Pune (IN); Ravi N Mulchandani, Pune (IN); Mammootty Muthira, San Jose, CA (US); Michael Baptist, Boise, ID (US); Ben E Neigebauer, Rosemount, MN (US)

(73) Assignee: DELL PRODUCTS L.P., Round Rock, TX (US)

( * ) Notice: Subject to any disclaimer, the term of this patent is extended or adjusted under 35 U.S.C. 154(b) by 369 days.

(21) Appl. No.: 18/538,164

(22) Filed: Dec. 13, 2023

(65) Prior Publication Data

US 2025/0199834 A1 Jun. 19, 2025

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
See application file for complete search history.

(56) References Cited

U.S. PATENT DOCUMENTS

| | | | | |
|---|---|---|---|---|
| 8,892,689 | B1 * | 11/2014 | Mowry | H04L 61/4541 709/219 |
| 12,250,268 | B2 | 3/2025 | Libby et al. | |
| 12,463,937 | B2 * | 11/2025 | Alarcon | H04L 61/5014 |
| 2019/0281014 | A1 * | 9/2019 | Lin | G06F 11/2023 |
| 2020/0387404 | A1 | 12/2020 | Baxter et al. | |

(Continued)

FOREIGN PATENT DOCUMENTS

CN 118473941 A * 8/2024 ......... H04L 12/4633

OTHER PUBLICATIONS

Non-Final Office Action received for U.S. Appl. No. 18/538,135 dated May 8, 2026, 11 pages.

*Primary Examiner* — Michael W Ayers
(74) *Attorney, Agent, or Firm* — Amin, Turocy & Watson, LLP

(57) ABSTRACT

The technology described herein is directed towards deploying a node cluster, e.g., in a cloud environment, based on user input data, including storage capacity and a delegated subnet. The subnet is divided into groups of internet protocol (IP) addresses for different usages, including for use by virtual network interface cards associated with virtual machines of the cluster. Based on the number of nodes determined from the input data, a static pool of primary IP addresses and a dynamic pool of secondary IP addresses are created for association with the virtual network interface cards. When the node cluster is operational, a failed virtual machine can be failed over to non-failed virtual machines by use of the secondary IP addresses previously associated with the failed virtual machine. Also described is handling IP address association with virtual network interface cards when the number of virtual machines of the cluster is increased or decreased.

20 Claims, 14 Drawing Sheets

(56) References Cited

U.S. PATENT DOCUMENTS

| | | | | |
|---|---|---|---|---|
| 2021/0334004 | A1* | 10/2021 | Krivenok | H04L 12/4641 |
| 2022/0166660 | A1* | 5/2022 | Hull | G06F 11/327 |
| 2022/0191168 | A1* | 6/2022 | Snehashis | H04L 41/22 |
| 2022/0206832 | A1* | 6/2022 | Berry | G06F 9/455 |
| 2022/0232073 | A1* | 7/2022 | Kuttuva Jeyaram | H04L 67/14 |
| 2024/0405976 | A1 | 12/2024 | Chen et al. | |
| 2025/0004814 | A1 | 1/2025 | Leimbach et al. | |
| 2025/0199833 | A1 | 6/2025 | Baptist et al. | |
| 2025/0272028 | A1 | 8/2025 | Soumpholphakdy et al. | |

* cited by examiner

LOAD BALANCING AND FAILOVER WITH VIRTUAL NETWORK INTERFACE IN A CLOUD-BASED CLUSTERED FILE SYSTEM

BACKGROUND

In cloud environments, cloud providers provide the ability for virtual network interface cards to be used for virtual appliances. Virtual network interfaces cards have some specific characteristics that do not match on-premises appliances. One example of a mismatched characteristic is that when deployed, a virtual interface card has a primary internet protocol (IP) address that is immutable. because the primary IP address is immutable, a virtual interface card cannot be failed over by moving the primary IP address from a failed virtual machine to a non-failed virtual machine, for example.

In addition to dealing with the characteristics of virtual network interface cards, to deploy a cloud-based node cluster a user (e.g., customer) currently has to provide a relatively large amount of input data, and deal with many manual steps to enable features such as load balancing and dynamic network file system failover and failback of client connections across storage nodes (e.g., via DELL SMARTCONNECT) of the storage node cluster (e.g., DELL POWERSCALE). Post-deployment workflow setup and execution also involves a number of user interactions, as does lifecycle management that alters the number of virtual machines in the node cluster.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
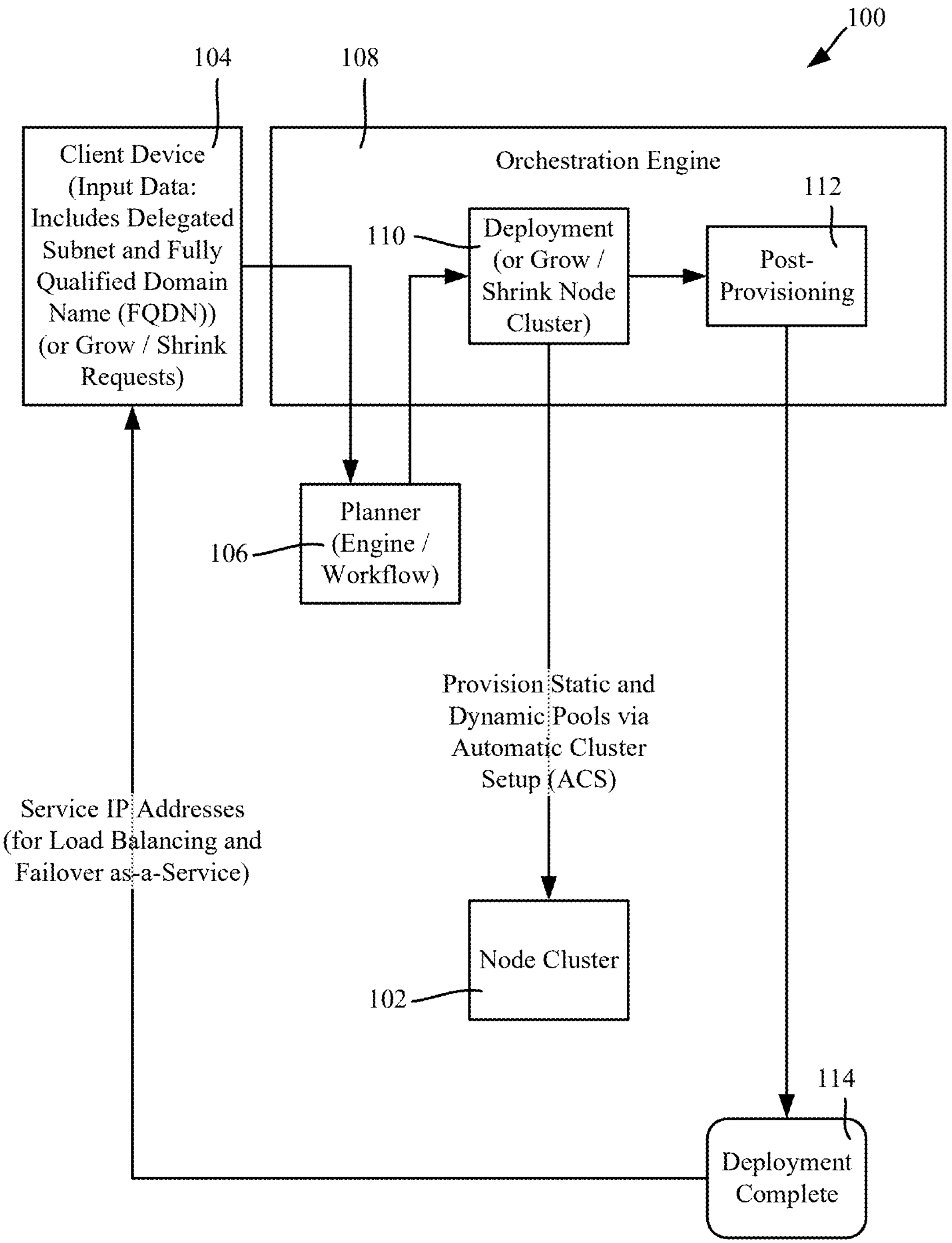
FIG. 1 is a block diagram showing an example system/architecture in which a planner determines division of internet protocol (IP) addresses for use in provisioning a node cluster, in accordance with various aspects and implementations of the subject disclosure.

Various aspects of the technology described herein are generally directed towards translating user input data, including a delegated subnet, into corresponding storage node cluster resources to be deployed. As part of automated planning for deployment of a storage node cluster, e.g., to be deployed in a cloud environment, the technology described herein divides up a delegated subnet (part of the input data) into groups of internet protocol (IP) addresses for different usages, including for use by virtual network interface cards associated with virtual machines/the nodes; ("nodes" and "virtual machines" are used interchangeably as described herein).

In one implementation, a static pool of primary IP addresses is created for association with the virtual network interface cards; these are immutable, and for example cannot be failed over to a different virtual machine. As such, the technology described herein creates a dynamic pool of secondary IP addresses for association with the virtual network interface cards. Once the node cluster is deployed, a failed virtual machine can be failed over to another, non-failed virtual, which then use the secondary IP addresses previously associated with the failed virtual machine for continued operation on the non-failed virtual machines with the secondary IP address of the virtual network interface card of the failed virtual machine. Moving the secondary IP address of the failed node onto a working-node allows clients connected to the failed node to continue communicating without perceiving an interruption (i.e., the IP address is still active, but just on a different virtual machine.

Once deployed, the node cluster can be increased in size (grown), with each new virtual machine obtaining an unused primary IP address from the delegated subnet for its virtual network interface card, along with at least two (unused) secondary IP addresses from the delegated subnet. The node cluster alternatively can be decreased in size (shrunk), with each removed virtual machine having the primary and secondary IP addresses associated with the virtual machine's virtual network interface card returned to unused status.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state.

FIG. 1 shows a generalized block diagram of an example system/architecture 100 including components that can be used to deploy a node cluster 102, and once deployed can be used to maintain/modify the node cluster 102. A client device 104, e.g., operated by a user or client process, inputs a request for storage capacity, which in this example represents a request to deploy a new node cluster. The request includes input data including how much capacity is needed, along with a delegated subnet, corresponding to a classless interdomain routing (CIDR) block of internet protocol (IP) address space to be evaluated by the system 100. More particularly, a planner (e.g., engine/workflow) 106 determines the number of nodes (e.g., virtual machines) needed to provide the capacity, (which also may depend on other input data such as client performance needs). Based on the number of nodes, the planner 106 determines the amount of IP addresses appropriate for the node cluster as described herein, and that the size of the CIDR block accommodates that amount of IP addresses.

The CIDR block/subnet is divided by the planner 106 into reserved address ranges based on the expected different usages of the node cluster components with respect to the client load balancing and dynamic network file system failover connections. The ranges include cloud network reserved IP addresses, service IP addresses (e.g., SSIP addresses, or SMARTCONNECT service IP addresses), primary IP addresses for virtual network interface cards (one primary IP address per node), and secondary IP addresses for virtual network interface cards. Unused IP addresses can be maintained in a data structure (e.g., a list), or can be found as needed, e.g., when adding virtual machines to the cluster as described herein.

In one example implementation, the number of secondary IP addresses to reserve per virtual machine is based on the formula (floor(N/10)+2), where N is the total number of virtual machines to be deployed in the node cluster. Using this formula facilitates handling load balancing on failover. By way of example, consider a four-node cluster, where (via the above formula) each virtual machine has a virtual network interface card with two secondary IP addresses. When a virtual machine fails, clients connected to that failed node will be balanced to (e.g., two) other virtual machines that are not failed by reassigning the secondary IP addresses to the failed over virtual machines/virtual network interface cards of the non-failed nodes. As a cluster gets larger, there are more secondary IP addresses per virtual machine, allowing load balancing across more nodes; (e.g., via the above formula, a cluster of less than nine virtual machines corresponds to two secondary IP addresses per virtual machine, ten-to-nineteen virtual machines corresponds to three secondary IP addresses per virtual machine, and so on).

Once the number of IP addresses is determined, the system 100 maps the primary and secondary IP addresses to the virtual network interface cards to be deployed with the virtual machines; this information is used to bootstrap the node cluster; (e.g., once the first virtual machine boots and creates the cluster, remaining nodes simple join and have the different IP addresses assigned appropriately for their virtual network interface card). At deployment time, the virtual network interface cards can be associated with the expected primary and secondary IP addresses, as obtained by an orchestration engine 108 that handles deployment operations (block 110) and post-provisioning operations (block 112) to complete formation of the node cluster 102. Automatic cluster setup (ACS), an existing technology in one or more example implementations, can be used for setting up the node cluster, including being appropriately updated for provisioning the static and dynamic pools as described herein.

Once the node cluster is formed, the bootstrap information facilitates automatic creation of the different IP address subnet portions and sets them up based on their expected usage. In particular, the primary IP addresses are provisioned into a static network pool, and secondary IP addresses into a dynamic network pool. When deployment is complete (block 114), the client device obtains the service IP addresses that were determined by the planner engine 106 for load balancing and failover connections.

Figure 2:
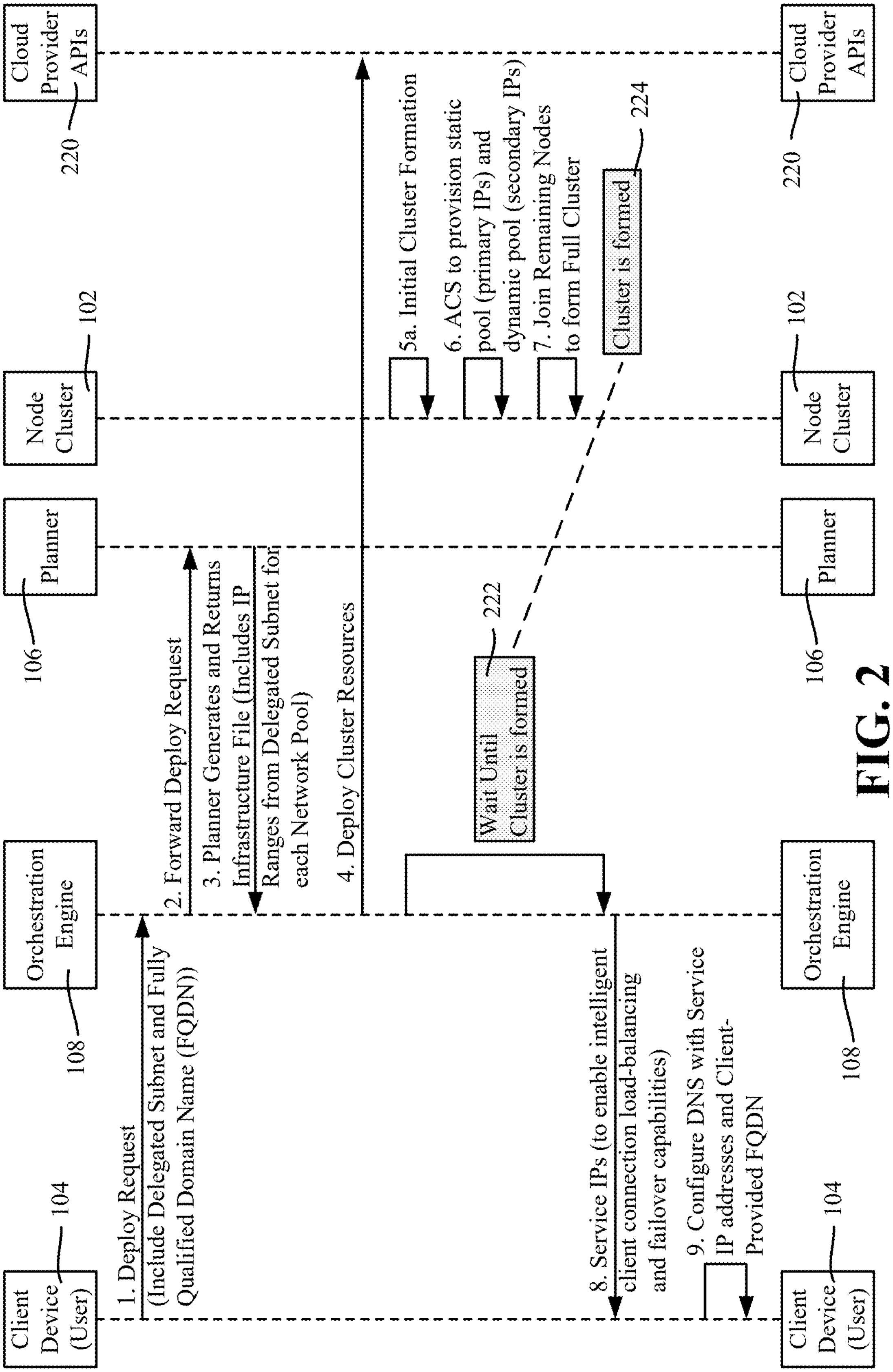
FIG. 2 is an example sequence diagram representation of dataflow among components with respect to an end-to-end workflow for deploying a node cluster, including with IP address ranges of a primary (static) pool and secondary (dynamic) pool, in accordance with various aspects and implementations of the subject disclosure.

FIG. 2 is an example sequence diagram showing the components and end-to-end dataflow/operations related to deployment, starting at labeled arrow one (1) which represents the deployment request from the client device 104 to the orchestration engine 108. As described herein, the request includes as input data the delegated subnet, and includes also a fully qualified domain name (FQDN) to be used with the service IP addresses. A client connection zone identifier or the like can be provided as input data such that through a single host name, client connection load balancing and dynamic failover and failback of client connections can be enabled across storage nodes to provide more optimal utilization of the cluster resources. Labeled arrow two (2) of FIG. 2 represents the orchestration engine 108 forwarding the deployment request to the planner 106.

Labeled arrow three (3) of FIG. 2 represents the planner 106 generating an infrastructure file (or other suitable data structure) for use by the orchestration engine 108. The planner 106, which receives the delegated subnet and the other input information including the capacity from the orchestration engine 108, operates as described with reference to FIGS. 3 and 4 to generate the infrastructure file as described herein and return information (via the infrastructure file at arrow three (3)) to the orchestration engine 108. The returned information includes the above-determined/reserved IP address ranges the from delegated subnet for each network pool.

With this information, the orchestration engine 108 deploys the cluster resources (arrow four (4)) by communicating with the cloud provider via cloud provider APIs 220. Note that the use of an orchestration engine 108 and cloud provider APIs are generally well-documented with respect to deployment of a node cluster, and are not described herein in detail. The orchestration engine 108 waits until the cluster is formed, as represented by block 222 of FIG. 2. In one implementation, the orchestration engine 108 polls the node cluster formation status until the node cluster has formed.

As triggered via the APIs 220, the orchestration environment including automatic cluster setup allows the cluster to form itself (arrow five (5)) in the cloud network. As described herein, automatic cluster setup is enhanced to include setting up of the network pools (arrow six (6)), including a static pool (of primary IP addresses) and a dynamic pool (of secondary IP addresses) based on the information previously generated and returned by the planner at arrow three (3). Arrow seven (7) represents forming the full node cluster; thereafter block 222 represents the orchestration engine 108 detecting (e.g., via polling) that the node cluster is formed.

As described with reference to FIGS. 3 and 4, the planner 106 also generates service IP addresses to enable intelligent client connection load-balancing and failover capabilities, which are returned by the orchestration engine 108 to the client device 104, as represented by arrow eight (8). This allows the client device 104 to configure its domain name system (DNS) server with the service IP addresses and the client-provided fully qualified domain name. To this end, existing automatic cluster setup capabilities can be used to assign a service name and DNS zone (using fully qualified domain name) and the service address IPs from the reserved service IP address range (arrow nine (9)). Note that the service name may only be tied to the dynamic pool. At this point the cluster is deployed the connections are enabled; after configuring the DNS server using the fully qualified domain name and the service IP addresses, the customer/user need not configure anything additional.

Figure 3:
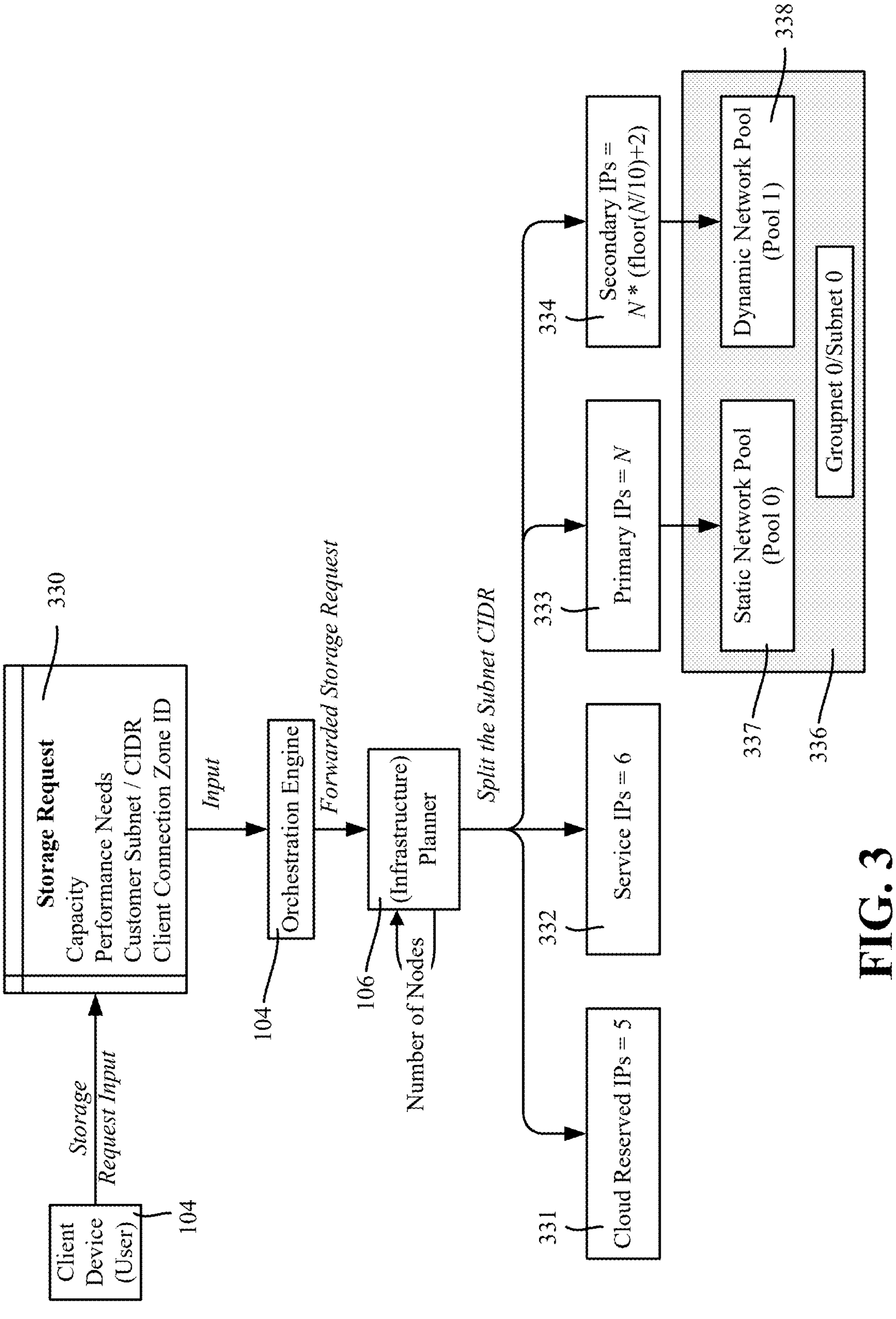
FIG. 3 is an example representation of IP address division based on a delegated subnet, in accordance with various aspects and implementations of the subject disclosure.
Figure 4:
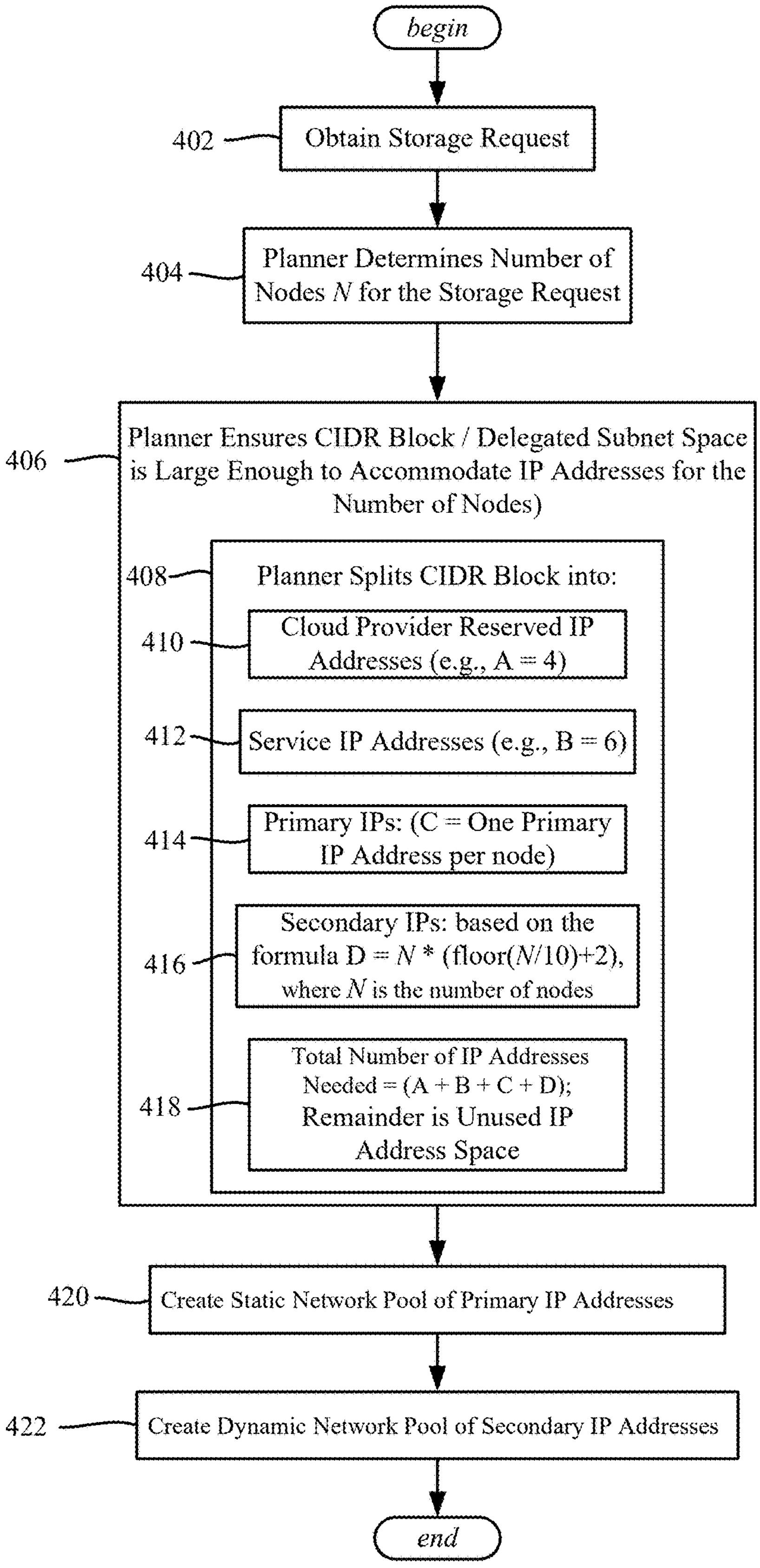
FIG. 4 is a flow diagram showing example operations related to dividing IP address space based on a number of nodes/virtual machines and their associated virtual network interface cards of a node cluster, in accordance with various aspects and implementations of the subject disclosure.

FIGS. 3 and 4 show additional example details related to IP address division according to the technology described herein, in which the client device 104 (FIG. 3) provides a storage request (block 330), with that request obtained (via the orchestration engine 104) by the planner 106 at operation 402 of FIG. 4. Based on the input data, which includes the customer-delegated subnet/CIDR block of IP address space, the planner 106 determines number of nodes N for the storage request at example operation 404, and at operation 406 ensures (determines that) the customer subnet/CIDR block of IP address space that is large enough to accommodate the IP addresses for the number of nodes determined at operation 404, (which may be the entire delegated subnet or a portion thereof). For example as described herein, if the planner determines the number of nodes to be 18, as will be understood a suitable minimum CIDR block is "/25" in CIDR notation, which corresponds to 128 IP addresses; (only 83 of the addresses are needed for 18 nodes in the example implementation described herein).

More particularly, as part of the deployment process, the planner 106 translates the user input data into resources to be deployed. The planner 106 includes logic that takes the delegated subnet (e.g., after determining the CIDR block) and divides the address space up for each of the usages by the virtual network interface cards. In one implementation, the subnet division is a first group 331 (e.g., a consecutive range of IP addresses in the CIDR block) for cloud reserved IP addresses, a second group 332 for a reserved service IP address range, a third group 333 for a reserved primary (static) IP address range, and a fourth group 334 for a reserved secondary IP address range. Note that instead of ranges of consecutive IP addresses, the separate groups can be maintained as data structures of IP addresses that may or may not include consecutive IP address ranges.

An example is shown via operations 406 and 408 of FIG. 4, in which (at operations 410 and 412) the planner sets aside four cloud-reserved IP addresses (A=4) and six service IP addresses (e.g., B=6), respectively. The service IP addresses can be based on a license agreement or the like, e.g., currently a maximum of six in one implementation, but not limited to this amount in other implementations. At operation 414, the planner reserves the primary IP addresses, e.g., C=the number of nodes N.

To move IP addresses for failover, the technology described herein uses secondary IP addresses, which are dynamic, because the primary IP addresses are immutable (static). To this end, at operation 416, the planner 106 reserves the total number of secondary IP addresses based on the number of nodes and the number of secondary addresses per node, e.g., D=N*(floor(N/10)+2). Note that although not explicitly shown, it is understood that as part of operation 406, the user can be prompted or the like with an error in the event that the delegated subnet corresponds to a bounded range of IP addresses that is not large enough for the needed nodes; (note that secondary IP addresses need to be in the same subnet as the primary IP addresses). Thus, in the above example of 18 nodes, if the specified CIDR block is not large enough (is not at least 128 IP addresses, i.e., "/25" in CIDR notation in the above example, then the system returns a failure, possibly along with a recommendation of what size/CIDR suffix is needed.

The total number of IP addresses is thus A+B+C+D in this example, and the remainder is set aside as unused space. Note that if desired to keep consecutive ranges in each group, some unused address space may be set aside, particularly for the primary IP group, by leaving a gap before starting the secondary IP group range. For example, with a range of 18 addresses reserved for the primary IP address group when N=18, such as 192.168.1.10-192.168.1.27, instead of starting the secondary IP address group at 192.168.1.28, the secondary IP address group can be started at 192.168.1.33 (or an even higher address) to facilitate expansion of the node cluster by adding nodes, while maintained ranges of consecutive IP addresses per group.

Operation 420 represents creating the static network pool of primary IP addresses 337 (FIG. 3). Operation 420 represents creating the dynamic network pool of secondary IP addresses 338 (FIG. 3). That is, using the reserved ranges 331-334, the system maps the ranges to the virtual network interface cards to be deployed with the virtual machines; this information is used to bootstrap the node cluster as described with reference to FIG. 2. At deployment time, each virtual network interface card has the expected primary and secondary IP addresses. Once the node cluster is formed, the bootstrap information allows automatically creating the different subnets and setting them up based on expected usage, e.g., block 336 (with primary IP addresses as a static network pool 337, and secondary IP addresses as a dynamic network pool 338).

The number of IP addresses is thus determined by the number of nodes. In one implementation, the number of primary IP addresses to reserve is one per node/virtual machine, e.g., N. The number of secondary IP addresses to reserve per virtual machine can be based on a suitable formula, such equal to the (floor(N/10)+2) where N is the total number of virtual machines being deployed in the node cluster. Using this formula facilitates handling load balancing on failover. By way of example, consider a four-node cluster, where each virtual machine has a virtual network interface card with two secondary IP addresses based on the above formula. When one virtual machine fails, clients connected to that node are balanced to two of the other virtual machines that are non-failed, including by reassigning the secondary IP addresses to the virtual network interface card on the working ("up") nodes. For a larger cluster, there will be more secondary IP addresses per node, allowing balancing across more nodes.

After deployment, also described herein is supporting lifecycle management that alters (e.g., to grow or shrink) the number of virtual machines in the cluster in a way that ensures that resources are provisioned appropriately. When adding virtual machines to a node cluster, in one implementation the planner 106 is responsible for determining the primary IP addresses and the appropriate number of secondary IP addresses from the delegated subnet/CIDR for assignment to each virtual network interface card to be added. The planner also determines whether additional secondary IP addresses need to be added to virtual network interface cards in the cluster; for example, based on the example formula floor(N/10)+2), if the number of virtual machines is increased from less than or equal to nine to greater than or equal to ten, the number of secondary IP addresses per virtual machine increases from two to three, meaning that existing virtual machines are assigned a third secondary IP address.

Figure 5:
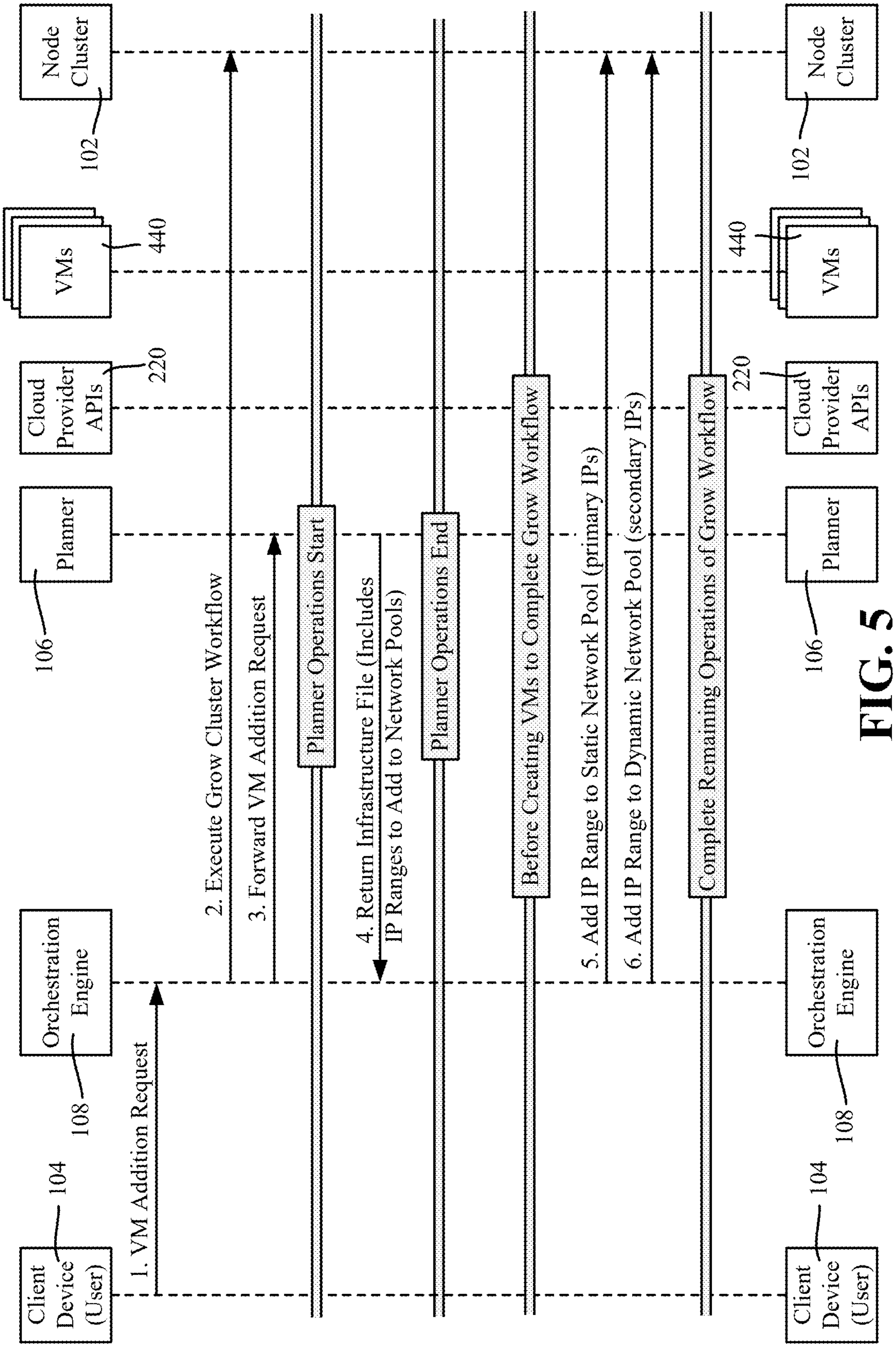
FIG. 5 is an example sequence diagram representation of dataflow among components with respect to a workflow for adding virtual machines to a node cluster, including increasing IP addresses of a static pool and dynamic pool, in accordance with various aspects and implementations of the subject disclosure.
Figure 6:
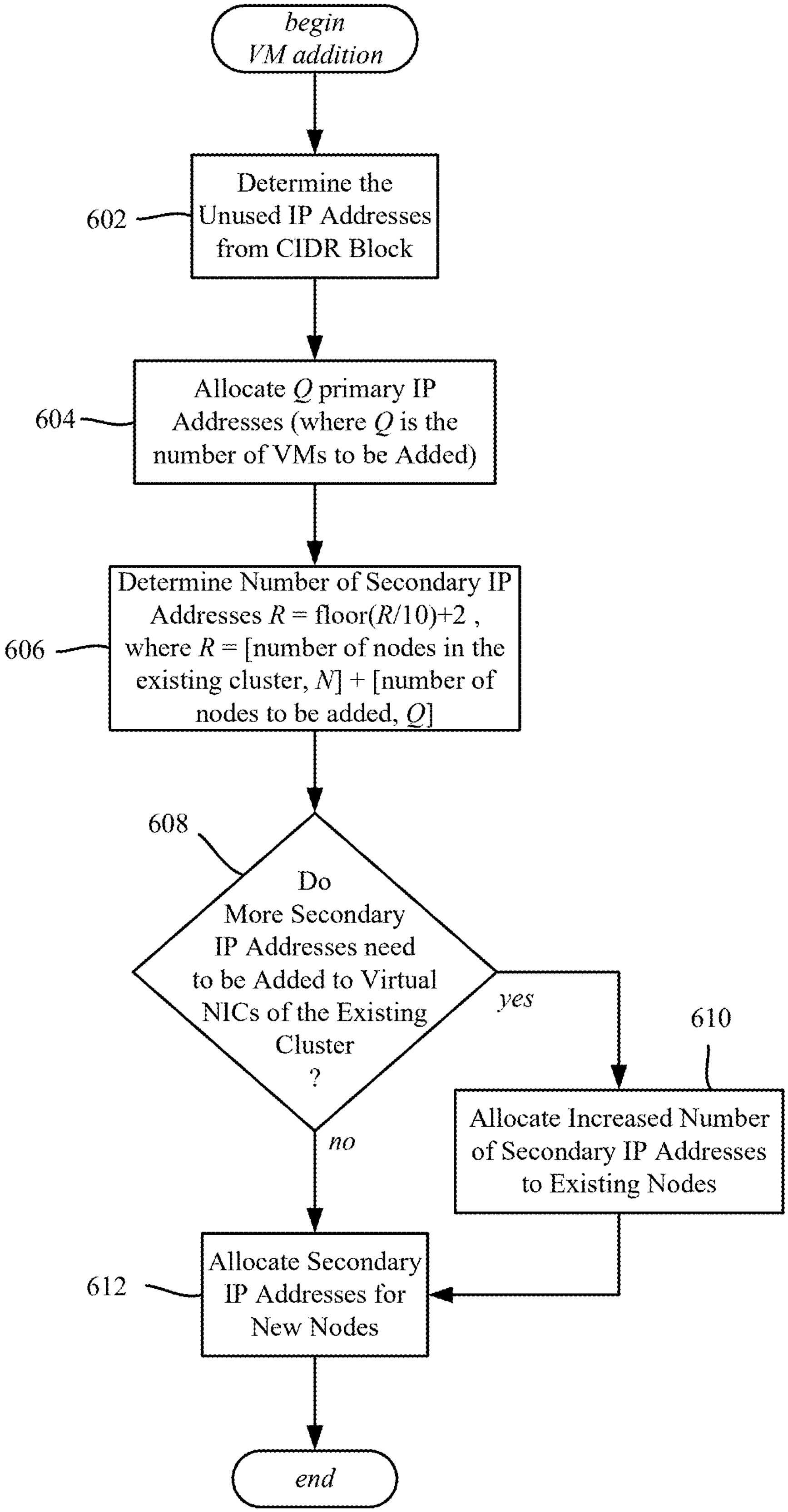
FIG. 6 is a flow diagram showing example operations related to increasing IP address space based on adding virtual machines and their associated virtual network interface cards to a node cluster, in accordance with various aspects and implementations of the subject disclosure.

The grow cluster workflow, represented as an example sequence diagram in FIG. 5, in conjunction with an example flow diagram in FIG. 6, ensures that each node is merged properly with the cluster. Growing the cluster begins at arrow (1) of FIG. 5, which represents a request to increase the number of virtual machines; this can be a specified number of virtual machines or a request to increase capacity/performance needs that the system (e.g., planner 106) converts to a number of virtual machines to add. Note that growing a cluster in general is an existing technology, e.g., triggered by the orchestration engine 108 (arrow two (2) of FIG. 5) upon receiving the request, and is thus not described herein in general. However, the existing technology of growing a cluster is significantly improved by the technology described herein so as to include virtual network interface cards with primary and secondary IP addresses. As such the orchestration engine 108 forwards the VM addition request which provides the planner 106 with the information needed to perform its operations, as shown via arrow three (3) of FIG. 5, including returning the infrastructure details (e.g., corresponding to the IP ranges to add to the network pools).

Example planner operations are shown in FIG. 6, in which at operation 602 the planner determines the unused IP addresses from the CIDR block; this can be by evaluating the existing ranges in the primary and secondary pools, or by maintaining a separate data structure (e.g., list) of unused IP addresses, depending on a given implementation. For example, is also feasible to have an implementation in which the primary and secondary pools each have two ranges of addresses, one for ranges in use and one for unused ranges which can be varied upon addition or removal of virtual machines.

Regardless of how primary and secondary addresses are maintained and tracked, operation 604 represents allocating Q primary IP addresses, where Q is the number of virtual machines to be added. Operation 606 represents determining a number of secondary IP addresses R=floor(R/10)+2, where R=[the number of nodes in the existing cluster, N]+[the number of nodes to be added, Q]. Based on operation 606, operation 608 determines if additional secondary IPs need to be added to the virtual network interface cards in the existing cluster, which operation 610 allocates to the existing nodes if appropriate. Operation 612 represents allocating the secondary IP addresses for the newly added nodes. Note that it is possible that the CIDR block may need to be enlarged based on the increased number of primary and secondary nodes; an error prompt or the like can be returned if doing so is not possible given the delegated subnet size.

Using the output from the planner 106, (assuming no errors occurred), the orchestration engine 108 applies changes to the existing network pools, including adding to or extending the pools based on the new IP ranges provided by the planner 106. This is represented in FIG. 5 by the arrows labeled five (5) and six (6). Once the different network pools have been extended, orchestration can proceed to deploy the virtual machines to be added to the cluster, e.g., complete the remaining operations of the grow cluster workflow.

When removing virtual machines from a cluster, in one implementation the planner 106 is responsible for identifying the virtual network interface card resources to be removed. Once provided with the output from the planner 106, orchestration will start a cluster shrink workflow, which will ultimately remove the resources from the cluster. Once the resources have been removed from the cluster, orchestration removes the associated IP addresses from the removed nodes from each of the different network pools. Removing the IP addresses from the network pools frees up IP addresses for the planner IP allocation determination if another grow cluster machine lifecycle management request is made.

Figure 7:
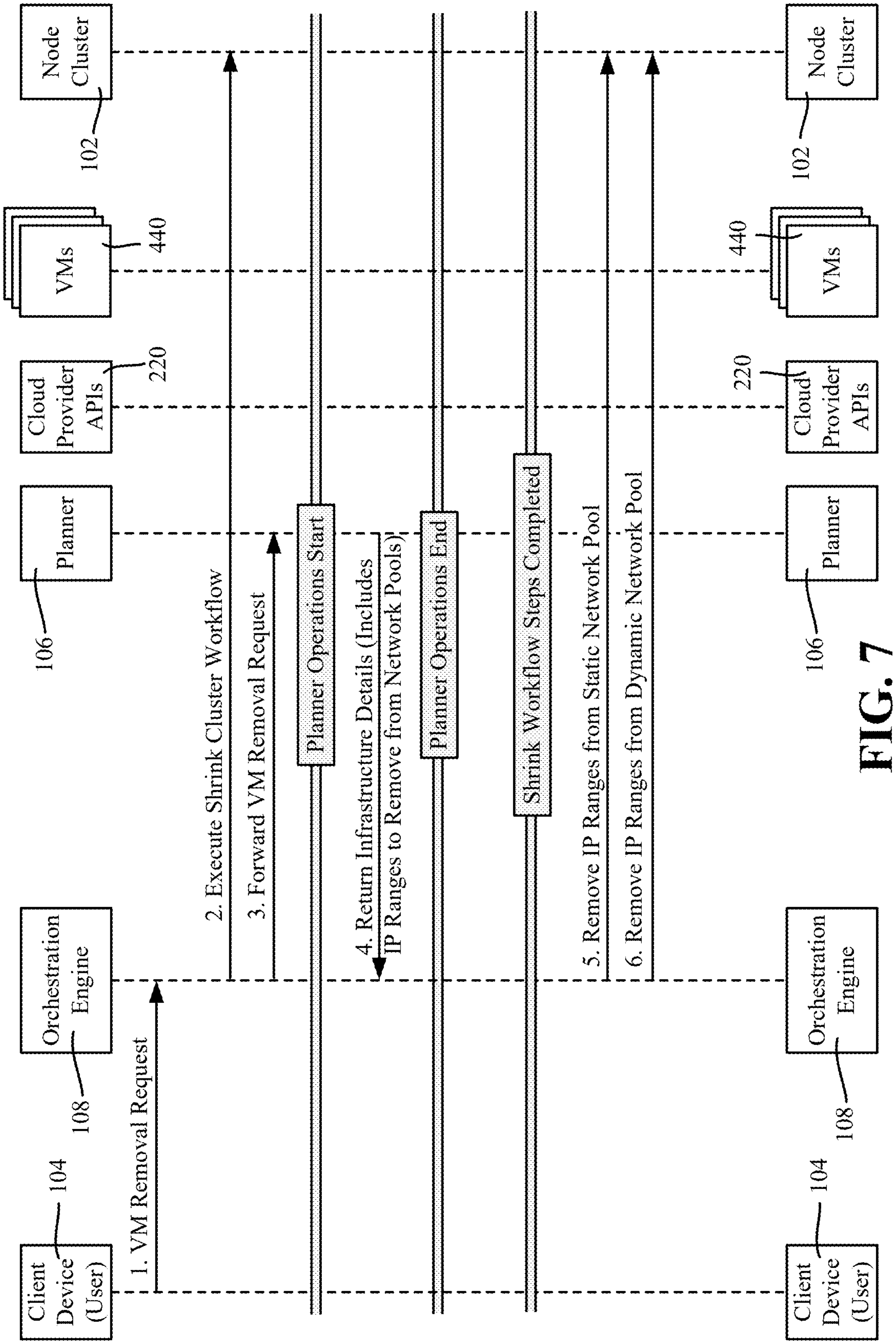
FIG. 7 is an example sequence diagram representation of dataflow among components with respect to a workflow for removing virtual machines from a node cluster, including removing IP addresses allocated to the removed virtual machines, in accordance with various aspects and implementations of the subject disclosure.
Figure 8:
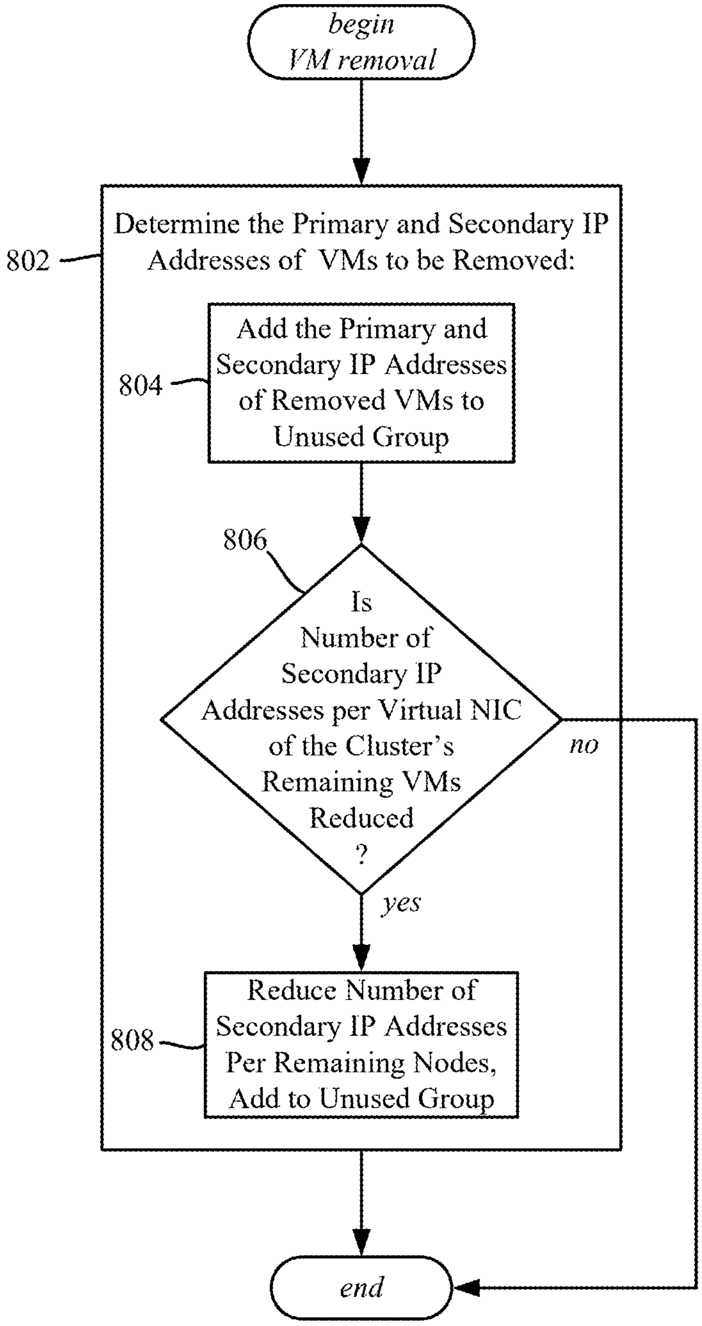
FIG. 8 is a flow diagram showing example operations related to removing IP address space based on removing virtual machines and their associated virtual network interface cards from a node cluster, in accordance with various aspects and implementations of the subject disclosure.

The shrink cluster workflow, represented as an example sequence diagram in FIG. 7, in conjunction with an example flow diagram in FIG. 8, ensures that the IP ranges are modified to represent the reduced cluster. Shrinking the cluster begins at arrow (1) of FIG. 7, which represents a request to decrease the number of virtual machines; this can be a specified number of virtual machines or a request to decrease capacity/performance needs that the system (e.g., planner 106) converts to a number of virtual machines to remove. Note that shrinking a cluster in general is an existing technology, e.g., triggered by the orchestration engine 108 (arrow two (2) of FIG. 5) upon receiving the request, and is thus not described herein in general. However, the existing technology of shrinking a cluster is significantly improved by the technology described herein so as to properly maintain the primary and secondary IP addresses associated with remaining virtual machines/virtual network interface cards, that is, remove those no longer associated with removed virtual machines. As such the orchestration engine 108 provides the planner 106 (via arrow three (3)) with the information needed to perform its operations, including returning the infrastructure details (e.g., corresponding to the IP ranges to remove from the network pools)

as shown via arrow four (4) of FIG. 7. Based on the IP ranges to remove from the network pools, the orchestration engine communicates with the node cluster 102 to remove them, as represented via arrows five (5) and six (6) of FIG. 7.

Example planner operations with respect to virtual machine removal are shown in FIG. 8, in which at operation 802 the planner determines the unused IP addresses from the CIDR block. This includes determining the IP addresses associated with the virtual machines to be removed, and adding these IP addresses to the unused list at operation 804.

Operation 806 determines whether the number of secondary IP addresses per virtual network interface card can be reduced because of the lesser number of total virtual machines, e.g., based on the floor formula described herein. If so, operation 808 reduces the number of secondary addresses of the remaining nodes. Thus, for example, if the number of virtual machines is decreased from having been greater than or equal to ten to now being less than ten, the number of secondary IP addresses per virtual machine can be decreased from three to two, meaning that remaining virtual machines will no longer be associated with a third secondary IP address.

Figure 9:
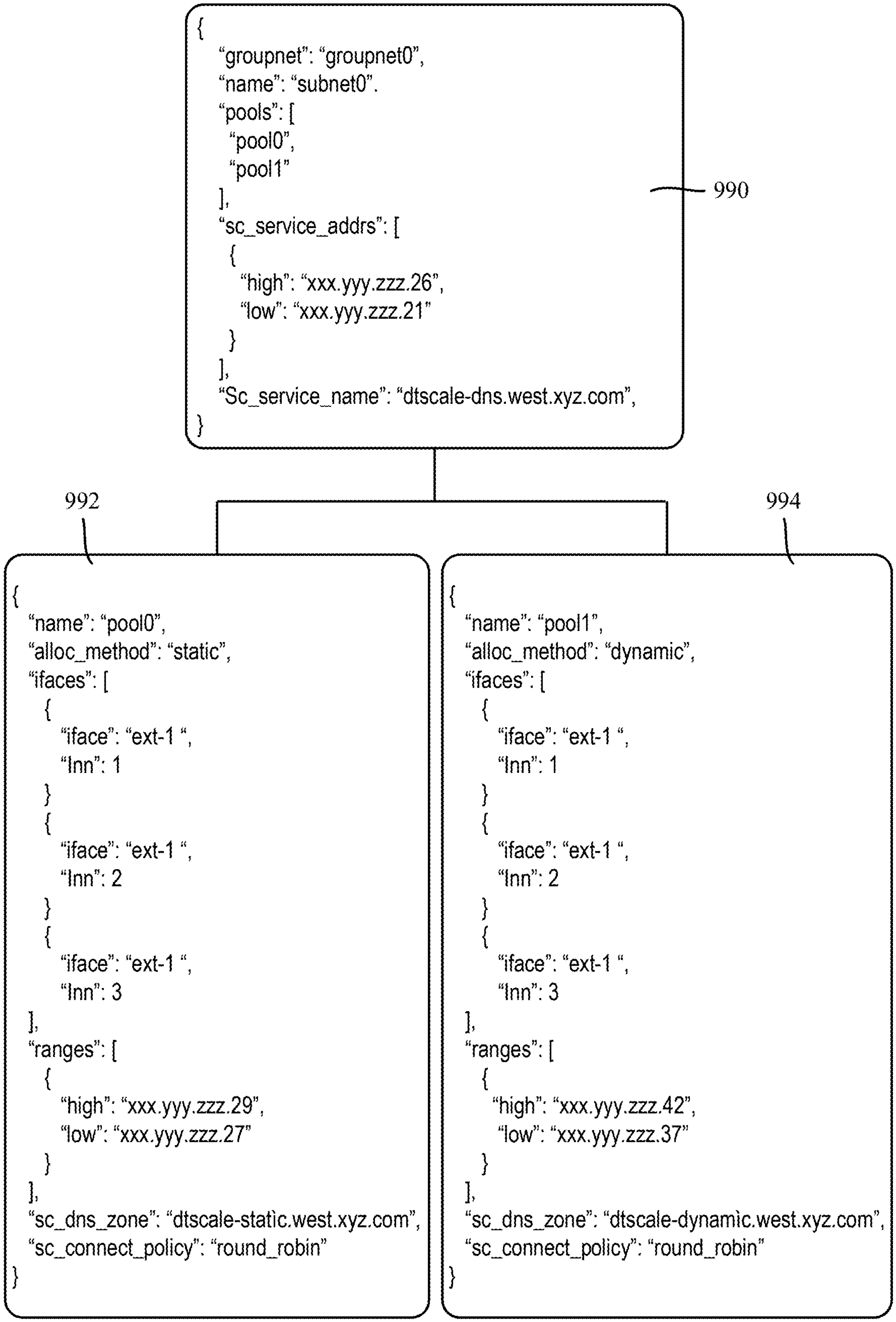
FIG. 9 is an example depiction of subnet division into network pools, including static and dynamic pools created in a node cluster, in accordance with various aspects and implementations of the subject disclosure.

FIG. 9 shows an example of subnets and network pools created in an example three node cluster based on the technology described herein. As can be seen at block 990, where "xxx", "yyy" and "zzz" represent suitable values, the service IP addresses are a range of (e.g., six) IP addresses xxx.yyy.zzz.21-xxx.yyy.zzz.26. These follow a range of cloud-reserved IP addresses, e.g., xxx.yyy.zzz.0 for network address, xxx.yyy.zzz.1 (reserved by the cloud for a default gateway), xxx.yyy.zzz.2 and xxx.yyy.zzz.3: (reserved by the cloud to map the DNS IP addresses to the VNet space), and xxx.yyy.zzz.127: (for a network broadcast address). The fully qualified domain name that was provided includes "west.xyz.com" as shown in blocks 990, 992 and 994.

The static pool data is represented in block 992 and includes three IP addresses (one per node in this three node cluster example), ranging from a "high" IP address of "xxx.yyy.zzz.29", and a "low" IP address of "xxx.yyy.zzz.27". The dynamic pool data is represented in block 994 and includes six IP addresses in this example, ranging from a "high" IP address of "xxx.yyy.zzz.42", and a "low" IP address of "xxx.yyy.zzz.37".

The following is an example use case in which the planner has calculated the number of nodes N to be 18. In this example, the planner divides the IP addresses as follows:

1. The minimum CIDR block for the 18 IP address space is/25. E.g., 192.168.1.0/25
2. This provides an effective range of 192.168.1.0-192.168.1.127 (a total of 128 IPs)
3. Based on the above planner operations, described in FIG. 4, the space is divided as:
   a. Cloud Reserved IP addresses—Total five IP addresses
      192.168.1.0: Network address
      192.168.1.1: Reserved by cloud for the default gateway
      192.168.1.2, 192.168.1.3: Reserved by cloud to map the DNS IPs to the VNet space
      192.168.1.127: Network broadcast address.
   b. Service IP addresses:
      192.168.1.4-192.168.1.9—Total six IP addresses (e.g., a maximum of 6 as licensed)
   c. Primary IPs of nodes.
      192.168.1.10-192.168.1.27—Total 18 IP addresses (1 Primary IP per node)
   d. Secondary IPs of nodes.
      192.168.1.28-192.168.1.81—Total 54 IP addresses (3 Secondary IPs per node based on the formula N*(floor(N/10)+2) where N=18).
   e. Total number of IP addresses for the 18 node cluster: 5+6+18+54=83.
   f. The remaining 45 IP addresses can be used for node replacements or expansion of the cluster in future. Note that instead of starting the secondary IP address range assignment (192.168.1.28) directly after the primary IP address range assignment (ending at 192.168.1.27), a gap can be left for future expansion. In this example, with the provided CIDR block, the cluster can grow up to 23 nodes.

The following is another example use case in which a customer deploys a node cluster and expects to begin using the cluster once deployment is complete.

Customer input data is provided as:
- 320 TB raw capacity
- Streaming Read: 4 Gbps/Node Writes: 2 Gbps/Node
- 192.168.100.0/24 CIDR for Connectivity
- FQDN for DNS: foo.west.xyz.com Planner divides subnet into the following:
- 8× VM instances with K volumes for each VM
- Service IP addresses: 192.168.100.4-192.168.100.9
- Primary IP addresses: Static Network Pool—192.168.100.10-17
- Secondary IP addresses: Dynamic Network Pool—192.168.100.28-43

Multi-Cloud Provisioning will:
- Use the Service IP addresses, Primary IP addresses, Secondary IP addresses, and FQDN to fill in the automatic cluster setup configuration to be used as user-data when launching VMs.

Once VMs have been launched and a cluster is forming/formed, automatic cluster setup will:
- Create Static Network Pool with range 192.168.100.10-17;
- Create Dynamic Network Pool with range 192.168.100.28-43;
- For the Dynamic Pool
  - Set client (for load balancing and dynamic network file system failover and failback) connections as Service Name to foo-dns.west.xyz.com
  - Set client connections Zone Name to foo.west.xyz-.com
  - Set client connections Service IP Address to 192.168.100.4-9;

Return to End-User:
- Client connections Service Address IP Addresses: 192.168.100.4-9
- Client connections URL: foo.west.xyz.com: 8080

End-User adds entry to DNS Server with FQDN and connections Service IP addresses. The client/end-user can now access the cluster through a suitable manager program or the like.

Figure 10:
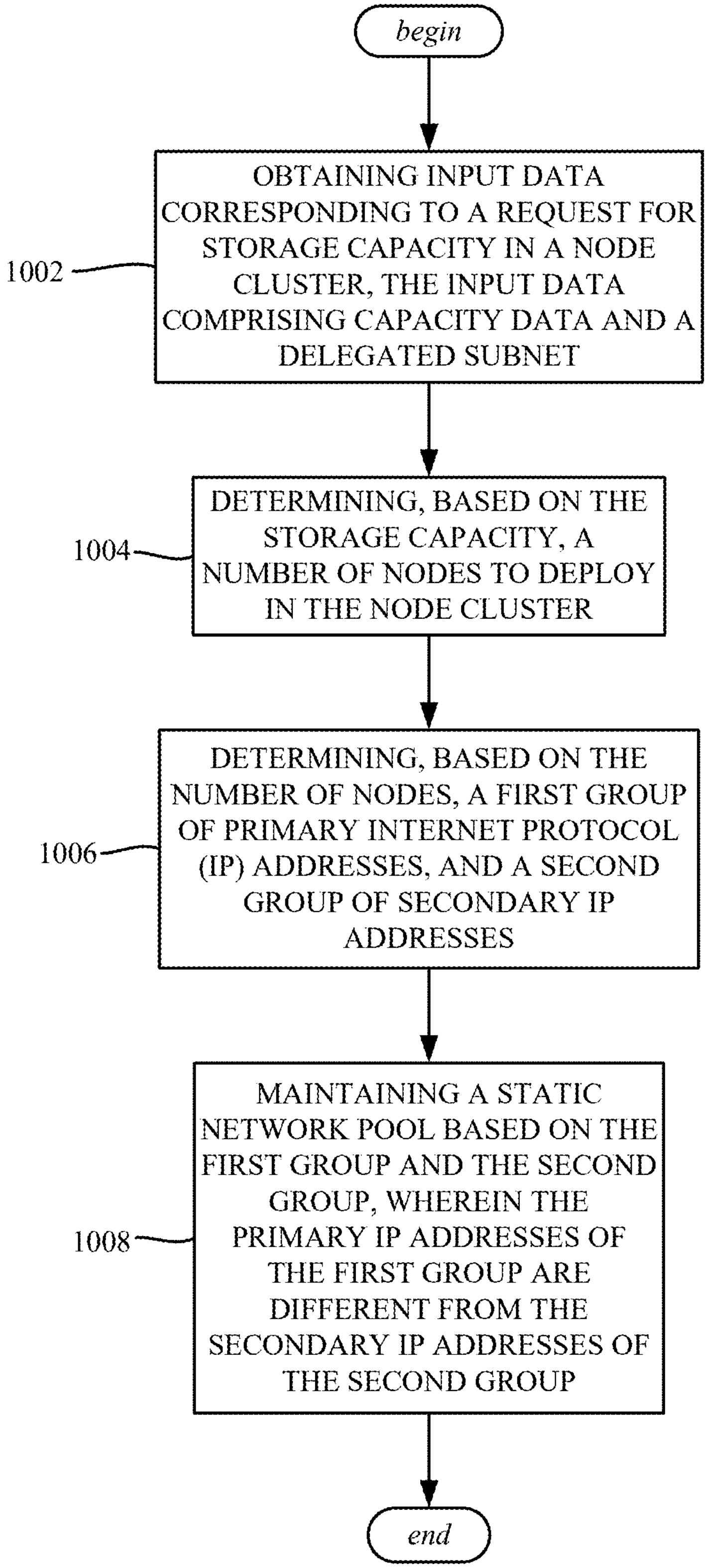
FIG. 10 is a flow diagram showing example operations related to determining primary IP addresses, and secondary IP addresses based on a number of nodes of a node cluster for use in provisioning the node cluster, in accordance with various aspects and implementations of the subject disclosure.

One or more aspects can be embodied in a system, such as represented in the example operations of FIG. 10, and for example can include a memory that stores computer executable components and/or operations, and a processor that executes computer executable components and/or operations stored in the memory. Example operations can include operation 1002, which represents obtaining input data corresponding to a request for storage capacity in a node cluster, the input data comprising capacity data and a delegated subnet. Example operation 1004 represents determining, based on the storage capacity, a number of nodes to deploy in the node cluster. Example operation 1006 determining, based on the number of nodes, a first group of primary internet protocol (IP) addresses, and a second group of secondary IP addresses. Example operation 1008 maintaining a static network pool based on the first group and the second group; the primary IP addresses of the first group are different from the secondary IP addresses of the second group.

The node cluster can operate in a cloud environment, and further operations can include reserving a third group of cloud-reserved IP addresses from the delegated subnet, the cloud-reserved IP addresses including at least one of: network address data, default gateway address data, domain name service IP-to-virtual network space mapping address data, or network broadcast address data; the cloud-reserved IP addresses of the third group are different from the primary IP addresses of the first group and different from the secondary IP addresses of the second group. Further operations can include reserving, from the delegated subnet, a fourth group of IP addresses comprising service IP addresses, and wherein the service IP addresses of the fourth group are different from the cloud-reserved IP addresses of the third group, different from the primary IP addresses of the first group, and different from the secondary IP addresses of the second group.

The first group of primary IP addresses can include a first consecutive range of IP addresses, and the second group of secondary IP addresses can include a second consecutive range of IP addresses.

The node cluster can operate in a cloud environment, and further operations can include determining that the delegated subnet includes a sufficient amount of IP address space for the number of nodes, and in response to the determining that the delegated subnet includes a sufficient amount of IP address space, reserving, from IP address space of the delegated subnet, a third group of cloud-reserved IP addresses, and reserving, from the IP address space of the delegated subnet, a fourth group of service IP addresses, wherein the first group of primary IP addresses and the second group of secondary IP addresses are within the IP address space of the delegated subnet, and wherein each IP address in the first group, the second group, the third group and the fourth group is within only one of: the first group, the second group, the third group or the fourth group.

The first group of primary IP addresses can include a first consecutive range of IP addresses, and the second group of secondary IP addresses can include a second consecutive range of IP addresses.

Obtaining of the input data further can include obtaining a fully qualified domain name.

Further operations can include deploying node cluster resources, the deploying comprising, associating respective nodes of the nodes to deploy with respective virtual network interface cards of respective virtual machines of the respective nodes, and associating the respective virtual network interface cards with a respective primary IP address from the static network pool, and at least two respective secondary IP addresses from the dynamic network pool.

Further operations can include failing over a virtual machine of a node, the failing comprising: balancing a failed virtual machine to a non-failed virtual machine, and reassigning, to the virtual network interface card of the non-failed virtual machine, the secondary IP addresses associated with the virtual network interface card of the failed virtual machine.

Further operations can include adding a new virtual machine to the node cluster, the new virtual machine associated with a new virtual network interface card, increasing the first number of the primary IP addresses in the static network pool based on first unused addresses of the delegated subnet, increasing the second number of the secondary IP addresses in the dynamic network pool based on second unused addresses of the delegated subnet, associating the new virtual network interface card with a previously unassociated primary IP address from the static network pool, and at least two previously unassociated respective secondary IP addresses from the dynamic network pool.

Further operations can include removing a respective virtual machine from the node cluster, the removing comprising removing the respective primary IP address associated with the respective virtual machine from the static network pool, and removing the at least two respective secondary IP addresses associated with the respective virtual machine from the dynamic network pool.

Further operations can include adding the respective primary IP address and the at least two respective secondary IP addresses to a group of unused IP addresses of the delegated subnet.

Figure 11:
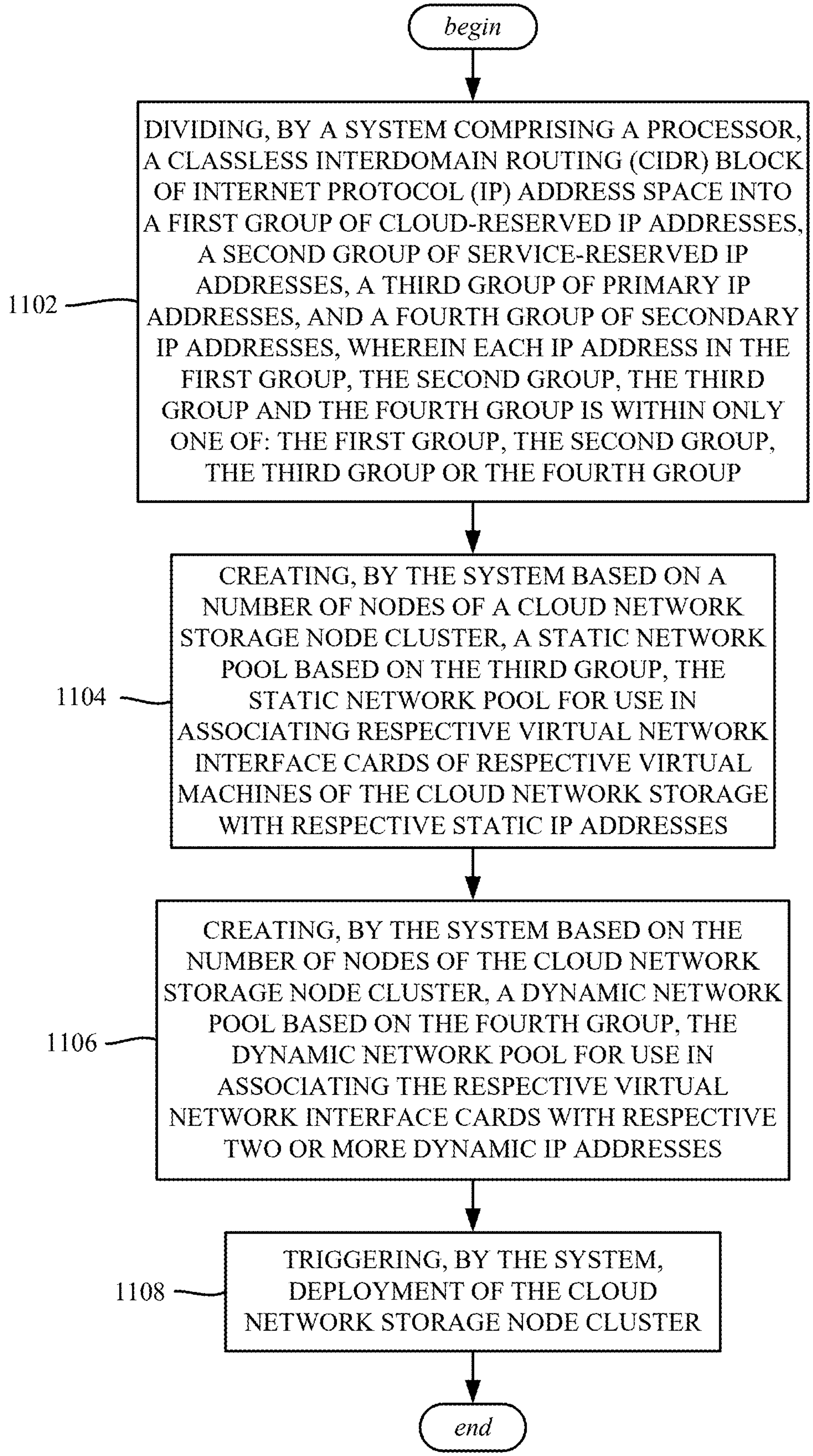
FIG. 11 is a flow diagram showing example operations related to creating network pools of IP address space, including a static pool and dynamic pool based on a number of nodes of a node cluster, in accordance with various aspects and implementations of the subject disclosure.

One or more example aspects, such as corresponding to example operations of a method, are represented in FIG. 11. Example operation 1102 represents dividing, by a system comprising a processor, a classless interdomain routing (CIDR) block of internet protocol (IP) address space into a first group of cloud-reserved IP addresses, a second group of service-reserved IP addresses, a third group of primary IP addresses, and a fourth group of secondary IP addresses, wherein each IP address in the first group, the second group, the third group and the fourth group is within only one of: the first group, the second group, the third group or the fourth group. Example operation 1104 represents creating, by the system based on a number of nodes of a cloud network storage node cluster, a static network pool based on the third group, the static network pool for use in associating respective virtual network interface cards of respective virtual machines of the cloud network storage with respective static IP addresses. Example operation 1106 represents creating, by the system based on the number of nodes of the cloud network storage node cluster, a dynamic network pool based on the fourth group, the dynamic network pool for use in associating the respective virtual network interface cards with respective two or more dynamic IP addresses. Example operation 1108 represents triggering, by the system, deployment of the cloud network storage node cluster.

Further operations can include receiving, by the system, a delegated subnet as part of a request for storage capacity, and wherein the dividing of the CIDR block of the IP address space is performed in response to the request for storage capacity.

The cloud network storage node cluster can be deployed, and further operations can include failing over, by the system, a failed virtual machine to a non-failed virtual machine of the cloud network storage node cluster, the failing over comprising reassigning the secondary IP addresses associated with the virtual network interface card of the failed virtual machine to the non-failed virtual machine.

Further operations can include, in response to a request to add a virtual machine, increasing, by the system, adding to a first number of IP addresses of the static network pool, and adding to a second number of IP addresses of the dynamic network pool.

Further operations can include, in response to a request to remove a virtual machine, decreasing, by the system, removing an IP address from the static network pool, and removing an IP address from the dynamic network pool.

Figure 12:
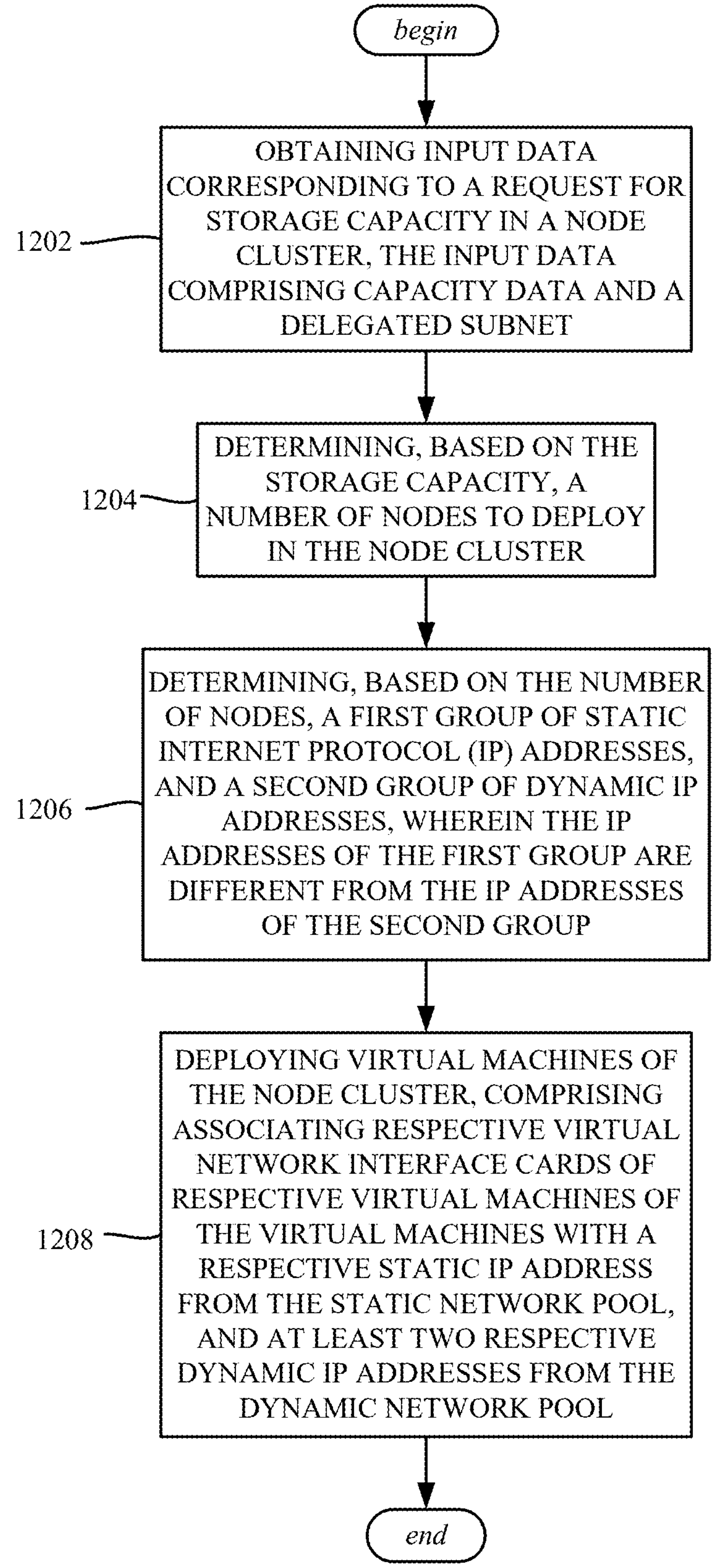
FIG. 12 is a flow diagram showing example operations related to deploying virtual machines of a node cluster, including associating respective virtual network interface cards with a respective static IP address from a static network pool and respective dynamic IP addresses from a dynamic network pool, in accordance with various aspects and implementations of the subject disclosure.

FIG. 12 summarizes various example operations, e.g., corresponding to a machine-readable medium, comprising executable instructions that, when executed by a processor, facilitate performance of operations. Example operation 1202 represents obtaining input data corresponding to a request for storage capacity in a node cluster, the input data comprising capacity data and a delegated subnet. Example operation 1204 represents determining, based on the storage capacity, a number of nodes to deploy in the node cluster. Example operation 1206 represents determining, based on the number of nodes, a first group of static internet protocol (IP) addresses, and a second group of dynamic IP addresses, wherein the IP addresses of the first group are different from the IP addresses of the second group. Example operation 1208 represents deploying virtual machines of the node cluster, comprising associating respective virtual network interface cards of respective virtual machines of the virtual machines with a respective static IP address from the static network pool, and at least two respective dynamic IP addresses from the dynamic network pool.

Further operations can include failing over a failed virtual machine of the cloud network storage node cluster to at least one non-failed virtual machine, the failing over comprising reassigning the secondary IP addresses associated with the virtual network interface card of the failed virtual machine to the at least one non-failed virtual machine.

Further operations can include at least one of: in response to a request to add a virtual machine to the cloud network storage node cluster, increasing a first size of the static network pool, and increasing a second size of the dynamic network pool, or in response to a request to remove a virtual machine from the cloud network storage node cluster, decreasing the first size of the static network pool, and decreasing the second size of the dynamic network pool.

As can be seen, the technology described herein facilitates IP assignment to enable load virtual machine balancing and failover via virtual network interface cards in a cloud environment, including for virtual network interface cards. A customer retains connectivity to the cluster in the event that a node goes down, via the secondary IP addresses that failover virtual machines without any IP address-related issues, overcoming the restrictions of existing cloud network interface cards. More specifically, via a provisioned dynamic pool using the secondary IP addresses for the virtual network interface cards on the virtual machines in the cluster, the subnet assigned for this dynamic pool provides the IP addresses used by the customer. The virtual network interface card still has a primary IP, which is tied to the static pool; however the customer does not leverage this for any connectivity, as doing so prevents failover capability.

At the same time, there is no additional work required by the end-user with the node cluster to enable load balancing and failover. Once deployment is complete, the end-user only needs to configure a DNS entry for their specified FQDN and the returned service IP addresses.

With respect to lifecycle management, the technology described herein works with and enhances the grow and shrink workflows to facilitate proper provisioning of virtual network interface cards such that the virtual network interface cards have the correct IP addresses provisioned. When adding virtual machines, the technology described herein adds to the appropriate ranges of the different network pools so that when the virtual machines join, nothing more needs to be done. When removing virtual machines, the technology described herein removes IP addresses associated to the virtual machines each of the different network pools, whereby those IP addresses become available to the planner for use if later adding virtual machines.

The technology described herein divides up the delegated subnet range within the cloud environment, which ensures that as larger clusters are deployed, more secondary IP addresses are set aside to ensure more balanced IP movement when failures occur. The technology described herein also provides an appropriate number of service IP addresses, e.g., based on the size of the cluster being deployed, which ensures that as a cluster grows, DNS functionality is maintained as virtual machine failure events occur.

Figure 13:
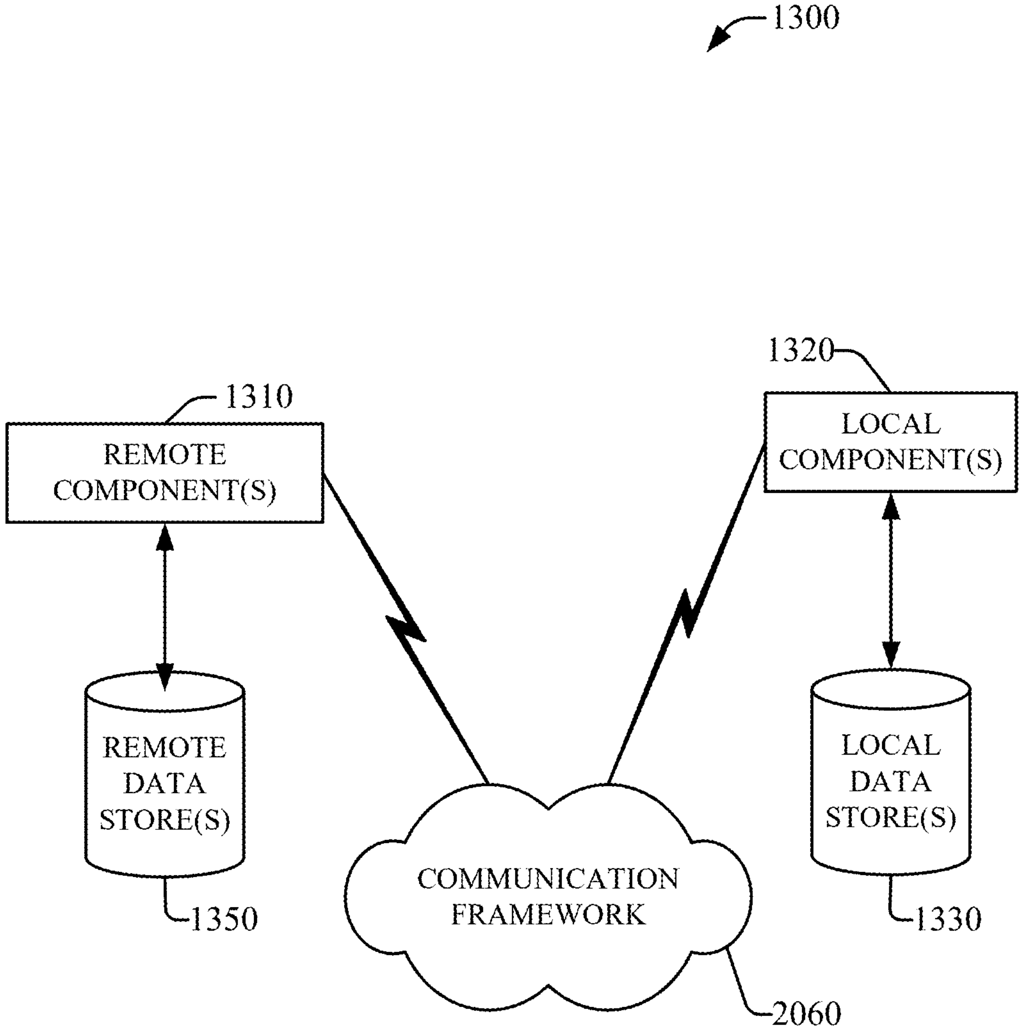
FIG. 13 is a block diagram representing an example computing environment into which aspects of the subject matter described herein may be incorporated.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
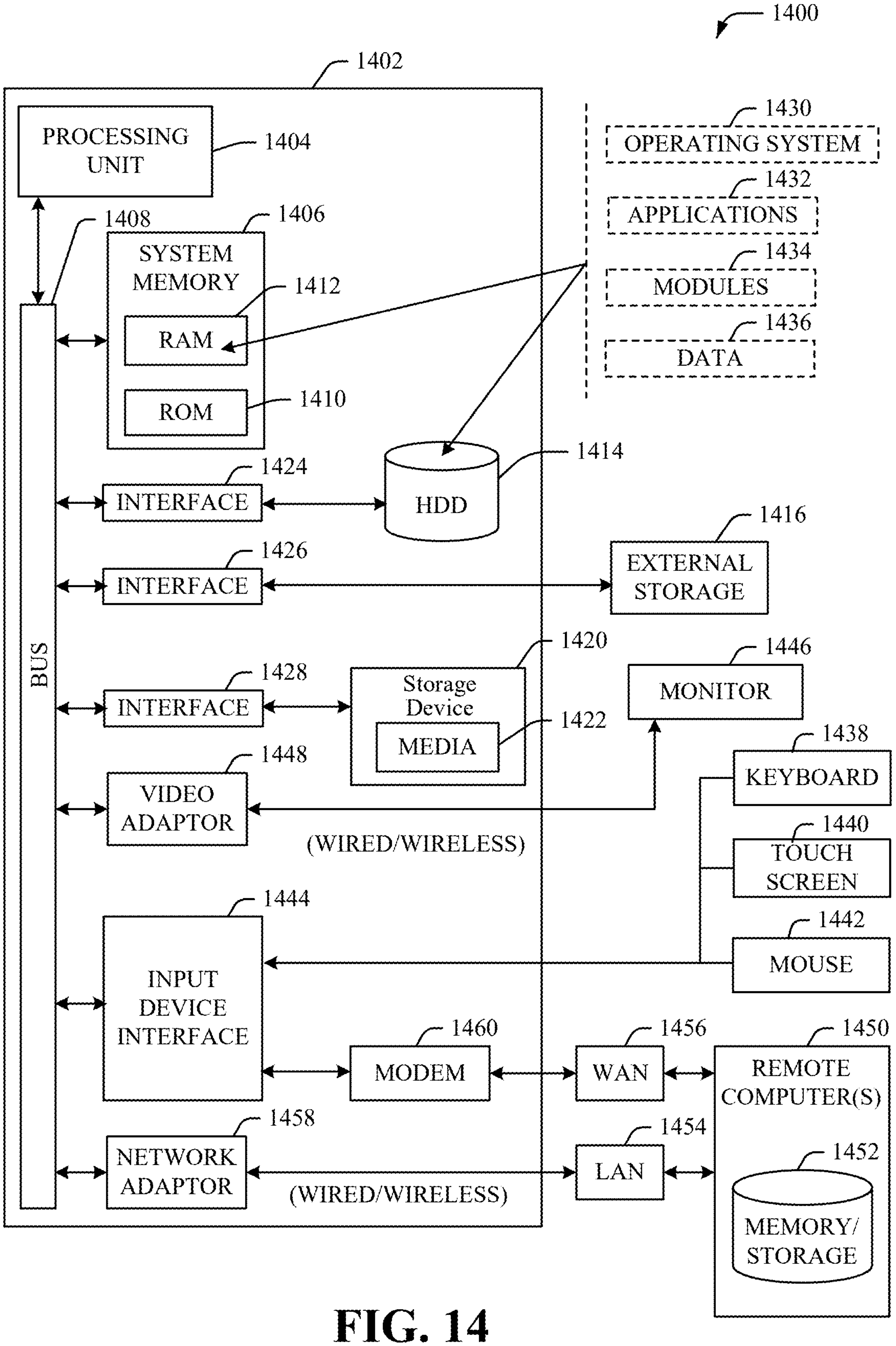
FIG. 14 depicts an example schematic block diagram of a computing environment with which the disclosed subject matter can interact/be implemented at least in part, in accordance with various aspects and implementations of the subject disclosure.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (virtual machine) of multiple virtual machines hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining input data corresponding to a request for storage capacity in a node cluster, the input data comprising capacity data and a delegated subnet, wherein the node cluster operates in a cloud environment;

determining, based on the storage capacity, a number of nodes to deploy in the node cluster;

determining, based on the number of nodes, a first group of primary internet protocol (IP) addresses, and a second group of secondary IP addresses;

maintaining a static network pool based on the first group and the second group, wherein the primary IP addresses of the first group are different from the secondary IP addresses of the second group;

deploying node cluster resources, the deploying comprising:

associating respective nodes of the nodes to deploy with respective virtual network interface cards of respective virtual machines of the respective nodes, and associating the respective virtual network interface cards with a respective primary IP address from the static network pool, and at least two respective secondary IP addresses from a dynamic network pool; and in response to the determining that the delegated subnet comprises a sufficient amount of IP address space, reserving, from IP address space of the delegated subnet, a third group of cloud-reserved IP addresses, and reserving, from the IP address space of the delegated subnet, a fourth group of service IP addresses, wherein the first group of primary IP addresses and the second group of secondary IP addresses are within the IP address space of the delegated subnet, and wherein each IP address in the first group, the second group, the third group and the fourth group is within only one of: the first group, the second group, the third group or the fourth group.

2. The system of claim 1, wherein the node cluster operates in a cloud environment, wherein the operations further comprise reserving a third group of cloud-reserved IP addresses from the delegated subnet, the cloud-reserved IP addresses comprising at least one of: network address data, default gateway address data, domain name service IP-to-virtual network space mapping address data, or network broadcast address data, and wherein the cloud-reserved IP addresses of the third group are different from the primary IP addresses of the first group and different from the secondary IP addresses of the second group.

3. The system of claim 2, wherein the operations further comprise reserving, from the delegated subnet, a fourth group of IP addresses comprising service IP addresses, and wherein the service IP addresses of the fourth group are different from the cloud-reserved IP addresses of the third group, different from the primary IP addresses of the first group, and different from the secondary IP addresses of the second group.

4. The system of claim 1, wherein the first group of primary IP addresses comprises a first consecutive range of IP addresses, and wherein the second group of secondary IP addresses comprises a second consecutive range of IP addresses.

5. The system of claim 1, wherein the obtaining of the input data further comprises obtaining a fully qualified domain name.

6. The system of claim 1, wherein the operations further comprise failing over a virtual machine of a node, the failing comprising:

balancing a failed virtual machine to a non-failed virtual machine, and reassigning, to a virtual network interface card of the non-failed virtual machine, the secondary IP addresses associated with the virtual network interface card of the failed virtual machine.

7. The system of claim 1, wherein the operations further comprise:

adding a new virtual machine to the node cluster, the new virtual machine associated with a new virtual network interface card, increasing a first number of the primary IP addresses in the static network pool based on first unused addresses of the delegated subnet;

increasing the second number of the secondary IP addresses in the dynamic network pool based on second unused addresses of the delegated subnet; and associating the new virtual network interface card with a previously unassociated primary IP address from the static network pool, and at least two previously unassociated respective secondary IP addresses from the dynamic network pool.

8. The system of claim 1, wherein the operations further comprise removing a respective virtual machine from the node cluster, the removing comprising:

removing the respective primary IP address associated with the respective virtual machine from the static network pool, and removing the at least two respective secondary IP addresses associated with the respective virtual machine from the dynamic network pool.

9. The system of claim 8, wherein the operations further comprise adding the respective primary IP address and the at least two respective secondary IP addresses to a group of unused IP addresses of the delegated subnet.

10. A method, comprising:

dividing, by a system comprising at least one processor, a classless interdomain routing (CIDR) block of internet protocol (IP) address space into a first group of cloud-reserved IP addresses, a second group of service-reserved IP addresses, a third group of primary IP addresses, and a fourth group of secondary IP addresses, wherein each IP address in the first group, the second group, the third group and the fourth group is within only one of: the first group, the second group, the third group or the fourth group;

creating, by the system based on a number of nodes of a cloud network storage node cluster, a static network pool based on the third group, the static network pool for use in associating respective virtual network interface cards of respective virtual machines of the cloud network storage with respective static IP addresses;

creating, by the system based on the number of nodes of the cloud network storage node cluster, a dynamic network pool based on the fourth group, the dynamic network pool for use in associating the respective virtual network interface cards with respective two or more dynamic IP addresses; and triggering, by the system, deployment of the cloud network storage node cluster.

11. The method of claim 10, further comprising receiving, by the system, a delegated subnet as part of a request for storage capacity, and wherein the dividing of the CIDR block of the IP address space is performed in response to the request for storage capacity.

12. The method of claim 10, wherein the cloud network storage node cluster is deployed, and further comprising failing over, by the system, a failed virtual machine to a non-failed virtual machine of the cloud network storage node cluster, the failing over comprising reassigning the secondary IP addresses associated with the virtual network interface card of the failed virtual machine to the non-failed virtual machine.

13. The method of claim 10, further comprising, in response to a request to add a virtual machine, increasing, by the system, adding to a first number of IP addresses of the static network pool, and adding to a second number of IP addresses of the dynamic network pool.

14. The method of claim 10, further comprising, in response to a request to remove a virtual machine, decreasing, by the system, removing an IP address from the static network pool, and removing an IP address from the dynamic network pool.

15. The method of claim 10, wherein the first group of cloud-reserved IP addresses comprises a first consecutive range of IP addresses, and wherein the second group of cloud-reserved IP addresses comprises a second consecutive range of IP addresses.

16. A non-transitory machine-readable medium, comprising executable instructions that, when executed by at least one processor, facilitate performance of operations, the operations comprising:

obtaining input data corresponding to a request for storage capacity in a node cluster, the input data comprising capacity data and a delegated subnet;

determining, based on the storage capacity, a number of nodes to deploy in the node cluster;

determining, based on the number of nodes, a first group of static internet protocol (IP) addresses, and a second group of dynamic IP addresses, wherein the IP addresses of the first group are different from the IP addresses of the second group;

deploying virtual machines of the node cluster, comprising associating respective virtual network interface cards of respective virtual machines of the virtual machines with a respective static IP address from a static network pool, and at least two respective dynamic IP addresses from a dynamic network pool; and failing over a failed virtual machine of the cloud network storage node cluster to at least one non-failed virtual machine, the failing over comprising reassigning the secondary IP addresses associated with the virtual network interface card of the failed virtual machine to the at least one non-failed virtual machine.

17. The non-transitory machine-readable medium of claim 16, wherein the operations further comprise at least one of:

in response to a request to add a virtual machine to the cloud network storage node cluster, increasing a first size of the static network pool, and increasing a second size of the dynamic network pool, or in response to a request to remove a virtual machine from the cloud network storage node cluster, decreasing the first size of the static network pool, and decreasing the second size of the dynamic network pool.

18. The non-transitory machine-readable medium of claim 16, wherein the first group of static IP addresses comprises a first consecutive range of IP addresses.

19. The non-transitory machine-readable medium of claim 18, wherein the second group of dynamic IP addresses comprises a second consecutive range of IP addresses, other than the first consecutive range of IP addresses.

20. The non-transitory machine-readable medium of claim 16, wherein the obtaining of the input data further comprises obtaining a fully qualified domain name.

* * * * *